US009015295B1

(12) United States Patent
Hwang et al.

(10) Patent No.: US 9,015,295 B1
(45) Date of Patent: Apr. 21, 2015

(54) METHOD, TERMINAL AND HEAD UNIT FOR AUTOMATICALLY PROVIDING APPLICATION SERVICES (71) Applicant: Obigo Inc., Gyeonggi-do (KR)

(72) Inventors: Doe Yun Hwang, Seoul (KR); Byung Soo Song, Seoul (KR); Jung Seok Lee, Gyeonggi-do (KR); Doo Hyun Han, Gyeonggi-do (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/461,817

(22) Filed: Aug. 18, 2014

(51) Int. Cl.
*G06F 7/00* (2006.01)
*H04L 29/08* (2006.01)

(52) U.S. Cl.
CPC ............... *H04L 67/10* (2013.01); *H04L 67/16* (2013.01); *H04L 67/34* (2013.01)

(58) Field of Classification Search
CPC ...... H04W 4/001; H04W 4/046; H04L 67/12; H04M 1/6075
USPC ............. 709/202, 227, 205, 226, 222; 701/36
See application file for complete search history.

(56) References Cited

U.S. PATENT DOCUMENTS

| 7,966,111 | B2* | 6/2011 | Moinzadeh et al. ......... 701/29.6 |
| 2005/0266879 | A1* | 12/2005 | Spaur et al. ................. 455/556.2 |
| 2011/0098087 | A1* | 4/2011 | Tseng ............................ 455/557 |
| 2013/0013148 | A1* | 1/2013 | Park ................................. 701/36 |
| 2013/0086518 | A1* | 4/2013 | Park et al. ...................... 715/808 |
| 2013/0196646 | A1* | 8/2013 | Oh et al. ........................ 455/418 |
| 2013/0238165 | A1* | 9/2013 | Garrett et al. ..................... 701/2 |
| 2013/0244634 | A1* | 9/2013 | Garrett et al. ................. 455/418 |
| 2014/0068010 | A1* | 3/2014 | Nicholson et al. ............ 709/219 |
| 2014/0277937 | A1* | 9/2014 | Scholz et al. ................... 701/36 |

* cited by examiner

*Primary Examiner* — David Lazaro
(74) *Attorney, Agent, or Firm* — Husch Blackwell LLP (57) ABSTRACT

The present invention relates to a method for automatically providing an application service by an interaction with a head unit at a terminal. The method includes steps of: (a) the terminal automatically creating a list including one or more runnable applications to be interacted with the head unit selected among one or more applications installed therein, if the connection with the head unit through a communication channel is detected; and (b) the terminal transferring the list to the head unit.

14 Claims, 4 Drawing Sheets

FIG. 2

METHOD, TERMINAL AND HEAD UNIT FOR AUTOMATICALLY PROVIDING APPLICATION SERVICES

FIELD OF THE INVENTION

The present invention relates to a method, a terminal, and a head unit for providing application services; and more particularly, to the method, the terminal and the head unit for automatically providing application services by the interaction between the terminal and the head unit under a circumstance where the terminal of a user and the head unit are connected through a communication channel.

BACKGROUND OF THE INVENTION

Attempts to execute applications installed in a smart phone are made through a head unit of a vehicle by the connection between the smart phone and the head unit.

Under a circumstance where the applications installed in the smart phone are provided through the head unit, a connection enabler application of the smart phone, however, is essentially necessary to connect the terminal and the head unit in order to control the applications.

Previously, services have been provided in a method for allowing a smart phone user to execute such connection enabler application directly and establishing the connection between the smart phone and the head unit by using the connection enabler application. But the limit of the user manipulating such a connection enabler application causes user inconvenience and impediment in concentration on driving. Besides, it may prevent a user from knowing applications to be provided through the connection enabler application, as the case may be.

The inventors of the present invention came to develop a technology of allowing the terminal and the head unit to interact with each other automatically by the function of the connection enabler application if the terminal such as a smart phone and the head unit of a vehicle are connected each other.

SUMMARY OF THE INVENTION

It is an object of the present invention to solve all the problems mentioned above.

It is another object of the present invention to allow a terminal and a head unit to interact with each other automatically by the function of a connection enabler application if the terminal such as a smart phone and the head unit of a vehicle are connected each other; and thus allow a plurality of applications installed at the terminal to be provided through the head unit.

In accordance with one aspect of the present invention, there is provided a method for automatically providing an application service by an interaction with a head unit at a terminal, including steps of: (a) the terminal automatically creating a list including one or more runnable applications to be interacted with the head unit selected among one or more applications installed therein, if the connection with the head unit through a communication channel is detected; and (b) the terminal transferring the list to the head unit.

In accordance with another aspect of the present invention, there is provided a method for automatically providing a service of an application installed in a terminal by an interaction with the terminal; including the steps of: (a) a head unit being connected to the terminal; and (b) the head unit receiving a list including one or more runnable applications to be interacted with the terminal selected among one or more applications installed in the terminal from the terminal, if the terminal detects a connection of a communication channel with the head unit and automatically creates the list.

In accordance with still another aspect of the present invention, there is provided a terminal for automatically providing an application service by an interaction with a head unit, including: a processing part for automatically creating a list including one or more runnable applications to be interacted with the head unit selected among one or more applications installed therein, if the connection with the head unit through a communication channel is detected; and a communication part for transferring the list to the head unit.

In accordance with still yet another aspect of the present invention, there is provided a head unit for automatically providing a service of an application installed in a terminal by an interaction with the terminal, including: a communication part for detecting a connection with the terminal; and a processing part for receiving a list including one or more runnable applications to be interacted with the terminal selected among one or more applications installed in the terminal from the terminal if a connection of the communication channel with the terminal is detected by the communication part and the list is automatically created by the terminal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of Whole System

Figure 1:
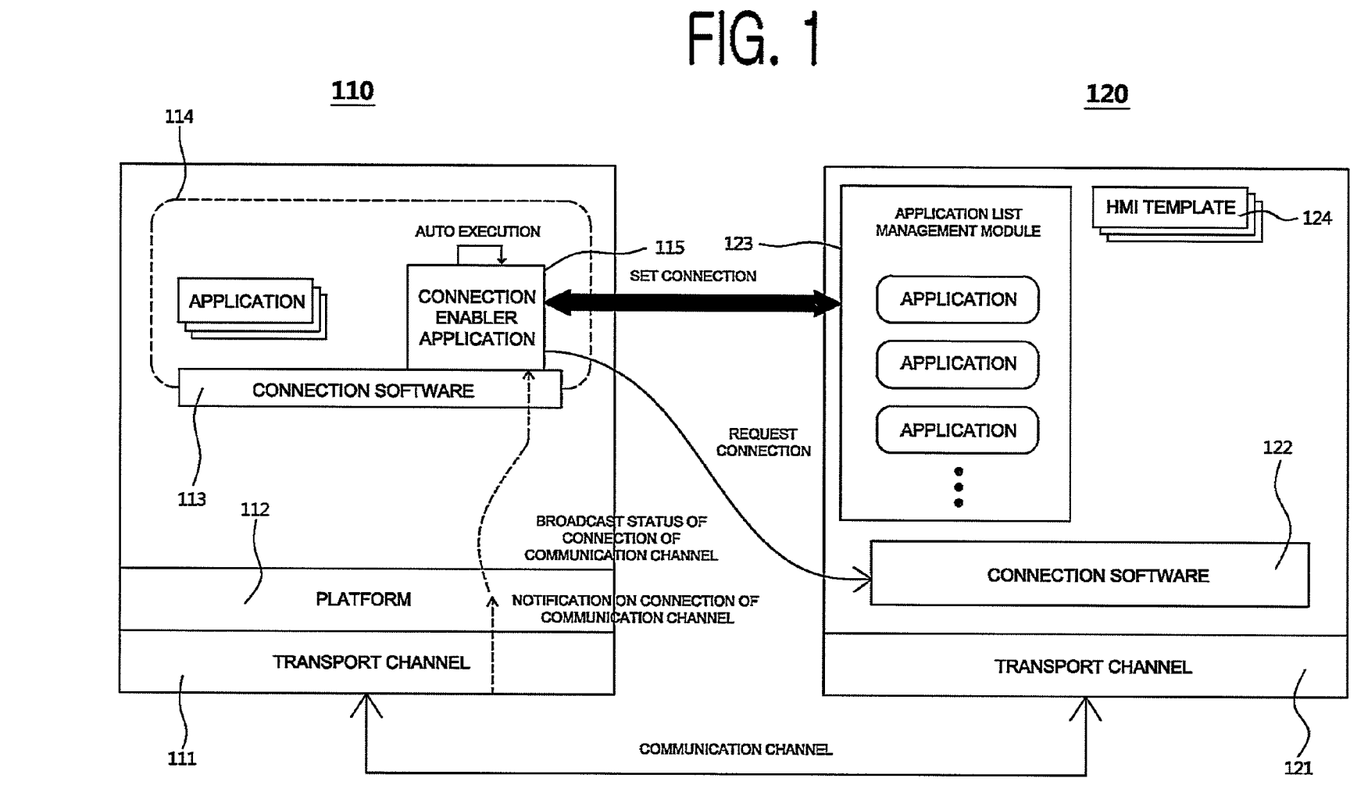
FIG. 1 is a drawing exemplarily showing the configuration of a whole system that provides services of applications of a terminal in accordance with the present invention.

FIG. 1 exemplarily shows a configuration of a whole system which provides services of applications of a terminal in accordance with the present invention.

As illustrated in FIG. 1, the whole system of the present invention may include a terminal 110 and a head unit 120.

The terminal 110 in accordance with an example embodiment of the present invention may be a mobile device, such as a smart phone, tablet PC, or laptop, where applications may be installed and services of the installed applications may be provided through the head unit 120.

In accordance with an example embodiment of the present invention, the terminal 110 may operate a platform 112, connection software 113 and one or more applications 114. The platform 112 may be a platform of a smart phone, etc.

In accordance with an example embodiment of the present invention, the one or more applications 114 may be one or more applications installed in the terminal 110 and also may include a connection enabler application 115.

In accordance with an example embodiment of the present invention, the head unit 120 may operate connection software 122, an application list management module 123, and one or more human-machine interface (HMI) templates 124.

In accordance with an example embodiment of the present invention, the terminal 110 and the head unit 120 may be connected through a communication channel. A transport channel 111 of the terminal 110 may represent the communication channel of the terminal 110 and a transport channel 121 of the head unit 120 may be the communication channel of the head unit 120. In other words, the transport channel 111 of the terminal 110 and the transport channel 121 of the head unit 120 may be the communication channel connected between the terminal 110 and the head unit 120.

In accordance with an example embodiment of the present invention, the terminal 110 and the head unit 120 may be connected through a variety of transmission media. The terminal 110 and the head unit 120 may be connected with each other through a wired or wireless network. For example, the terminal 110 and the head unit 120 may be connected with each other through a wired network such as universe serial bus (USB) or a wireless network such as Bluetooth (BT), and WiFi.

If detecting the connection with the head unit 120, the terminal 110 in accordance with an example embodiment of the present invention may transfer a notification on the connection to the platform 112 thereof. Receiving the notification, the platform 112 may broadcast a status of the connection with the head unit to one or more applications, installed in the terminal 110, including the connection enabler application 115. Herein, the one or more applications may be those which request an alarm on the status of the connection with the head unit 120. The terminal 110 may use the connection software 113 to broadcast the status of the communication channel.

In accordance with an example embodiment of the present invention, if the connection between the terminal 110 and the head unit 120 is detected through the course as specified above, the connection enabler application 115 may be automatically executed. If receiving the alarm on the connection with the head unit 120, the connection enabler application 115 may execute itself.

In accordance with an example embodiment of the present invention, the connection enabler application 115 may request the connection software 122 of the head unit 120 to be connected with the application list management module 123 which manages a list of the applications of the head unit 120. The connection enabler application 115 may request the connection with the application list management module 123. By responding to the request for the connection with the application list management module 123, the connection software 122 of the head unit 120 may set the connection between the connection enabler application 115 and the application list management module 123. If the connection between the connection enabler application 115 and the application list management module 123 is set, a basic environment under which a user of the head unit 120 may run the application of the terminal 110 may be provided.

If the connection with the head unit 120 is set, the connection enabler application 115 in accordance with an example embodiment of the present invention may automatically create a list of one or more runnable applications to be interacted with the head unit 120 connected with the terminal 110 among applications installed in the terminal 110 and may transfer the list to the head unit 120 to allow a user of the head unit 120 to select a specific application among the applications included in the list and allow the selected specific application to be run.

In accordance with an example embodiment of the present invention, the application list management module 123 of the head unit 120 may receive the list of one or more runnable applications to be interacted with the head unit 120 from the connection enabler application 115 in the terminal 110. The application list management module 123 may display information on the one or more runnable applications to be interacted with the head unit 120 by referring to the received list. The head unit 120 may also use the one or more HMI templates 124 to display the information on the one or more runnable applications.

In accordance with an example embodiment of the present invention, the application list management module 123 may receive information on the selection of the specific application to be run among the one or more runnable applications to be interacted with the head unit 120 from the user of the head unit 120. After receiving the information on the selection of the specific application to be run, the head unit 120 may run the specific application by interacting with the terminal 110.

Figure 2:
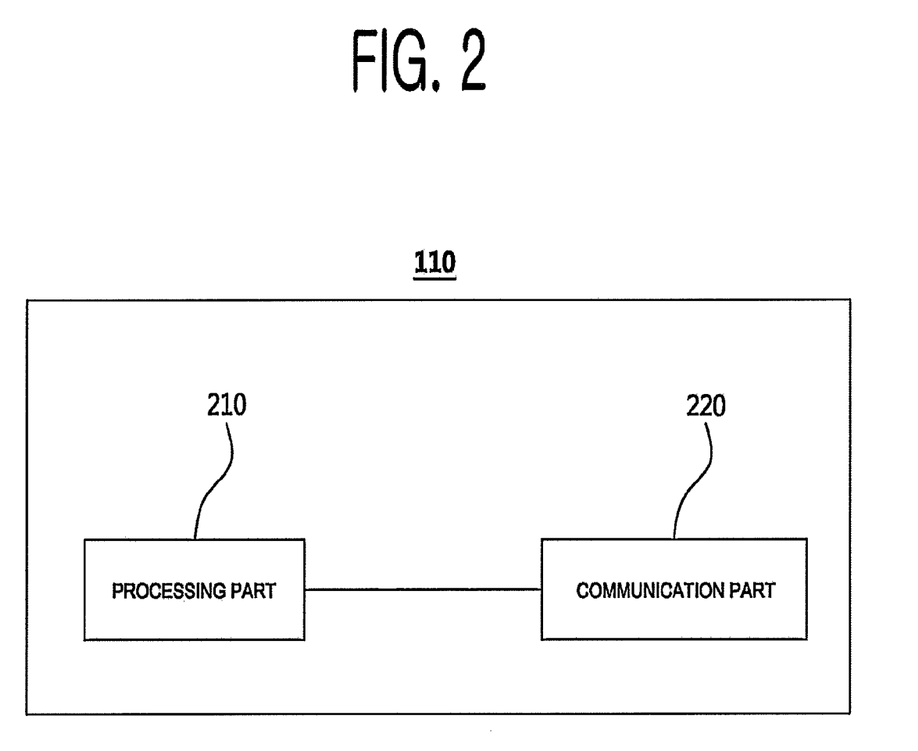
FIG. 2 is a drawing exemplarily showing a configuration of the terminal in accordance with an example embodiment of the present invention.

FIG. 2 represents a configuration of the terminal 110 in accordance with an example embodiment of the present invention.

In accordance with an example embodiment of the present invention, the terminal 110 may also include a processing part 210 and a communication part 220.

For reference, the one example embodiment of the present invention as described above by referring to FIG. 1 might explain functions or operations of the terminal 110 from the aspects of software components in the terminal 110, e.g., kernel or its component, process, module, service, etc., capable of providing the functions or performing the operations. The functions or the operations of such software components may be processed if the processing part 210 of the terminal 110 executes codes of the software components or the communication part 220 thereof operates by the execution of the codes. Accordingly, the functions or the operations of the transport channel 111, the platform 112, the connection software 113, the one or more applications 114, and the connection enabler application 115 as stated above by referring to FIG. 1 may be performed by the processing part 210 that executes the codes of the transport channel 111, the platform 112, the connection software 113, the one or more applications 114, and the connection enabler application 115 and by the communication part 220 that operates by the execution of the codes.

In other words, the processing part 210 may process the operations of the transport channel 111, the platform 112, the connection software 113, the one or more applications 114, and the connection enabler application 115 as described above. More specifically, the processing part 210 may execute the codes of the transport channel 111, the platform 112, the connection software 113, the one or more applications 114, and the connection enabler application 115 as explained above.

In addition, the communication part 220 may process a communication with the head unit 120. More concretely, the communication part 220 may process the operation of the communication by the execution of the codes of the transport channel 111, the platform 112, the connection software 113, the one or more applications 114, and the connection enabler application 115.

The functions of the processing part 210 and the communication part 220 in accordance with an example embodiment of the present invention will be explained in detail by referring to FIG. 4 as shown below.

Figure 3:
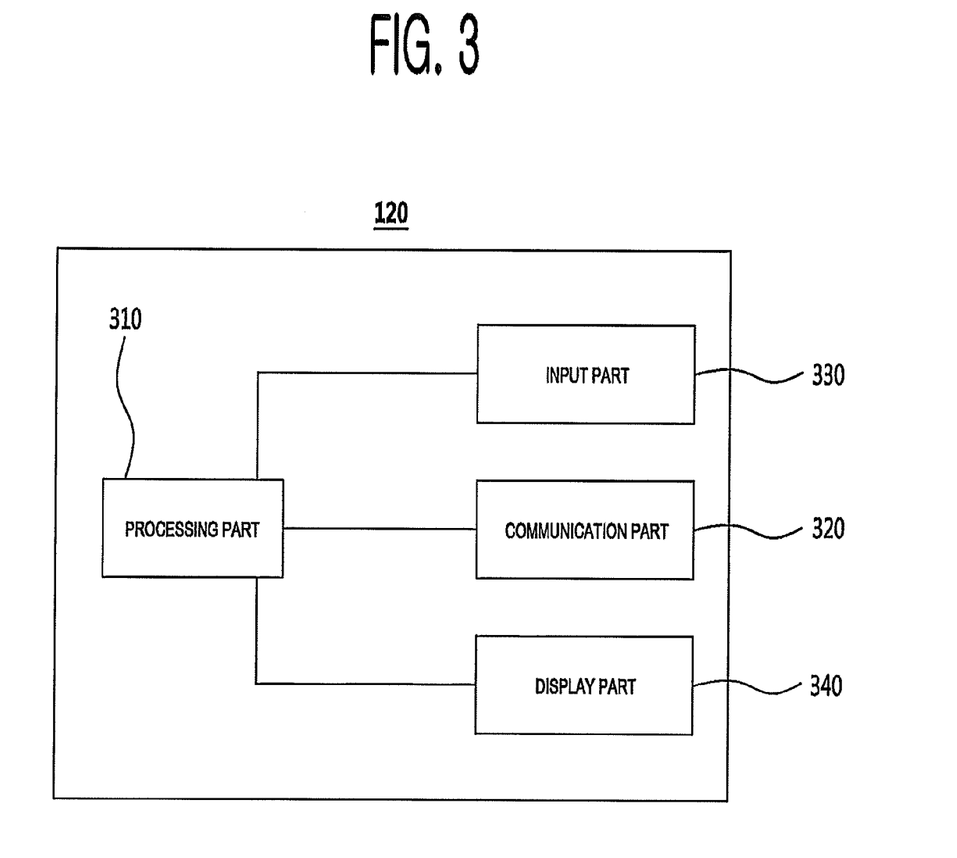
FIG. 3 is a configuration of a head unit in accordance with an example embodiment of the present invention.

FIG. 3 represents a configuration of the head unit 120 in accordance with an example embodiment of the present invention.

In accordance with an example embodiment of the present invention, the head unit 120 may also include a processing part 310, a communication part 320, an input part 330, and a display part 340.

For reference, the example embodiment of the present invention as mentioned above by referring to FIG. 1 might explain functions or operations of the head unit 120 from the aspects of software components, e.g., kernel or its component, process, module, service, etc., in the head unit 120 capable of providing the functions or performing the operations. The functions or the operations of such software components may be processed if the processing part 310 of the head unit 120 executes codes of the software components or the communication part 320, the input part 330, and the display part 340 of the head unit 120 operate by the execution of the codes. Accordingly, the functions or the operations of the transport channel 121, the connection software 122, the application list management module 123 and the one or more HMI templates 124 as stated above by referring to FIG. 1 may be performed by the processing part 310 that executes the codes of the transport channel 121, the connection software 122, the application list management module 123, and the one or more HMI templates 124 and by the communication part 320, the input part 330, and the display part 340 that operate by the execution of the codes.

In other words, the processing part 310 may process the operations of the transport channel 121, the connection software 122, the application list management module 123, and the one or more HMI templates 124. More specifically, the processing part 310 may execute the codes of the transport channel 121, the connection software 122, the application list management module 123, and the one or more HMI templates 124.

Besides, the communication part 320 may process the communication with the terminal 110. More specifically, the communication part 320 may process the operation of the communication by the execution of the codes of the transport channel 121, the connection software 122, the application list management module 123, and the one or more HMI templates 124 as stated above.

In addition, the input part 330 may receive the input from the user of the head unit 120. More concretely, the input part 330 may process the operation of an input by the execution of the codes of the transport channel 121, the connection software 122, the application list management module 123, and the one or more HMI templates 124 as described above.

Moreover, the display part 340 may display information to be provided for the user of the head unit 120. More distinctly, the display part 340 may process the operation of a display by the execution of the codes of the transport channel 121, the connection software 122, the application list management module 123, and the one or more HMI templates 124 as mentioned above.

Figure 4:
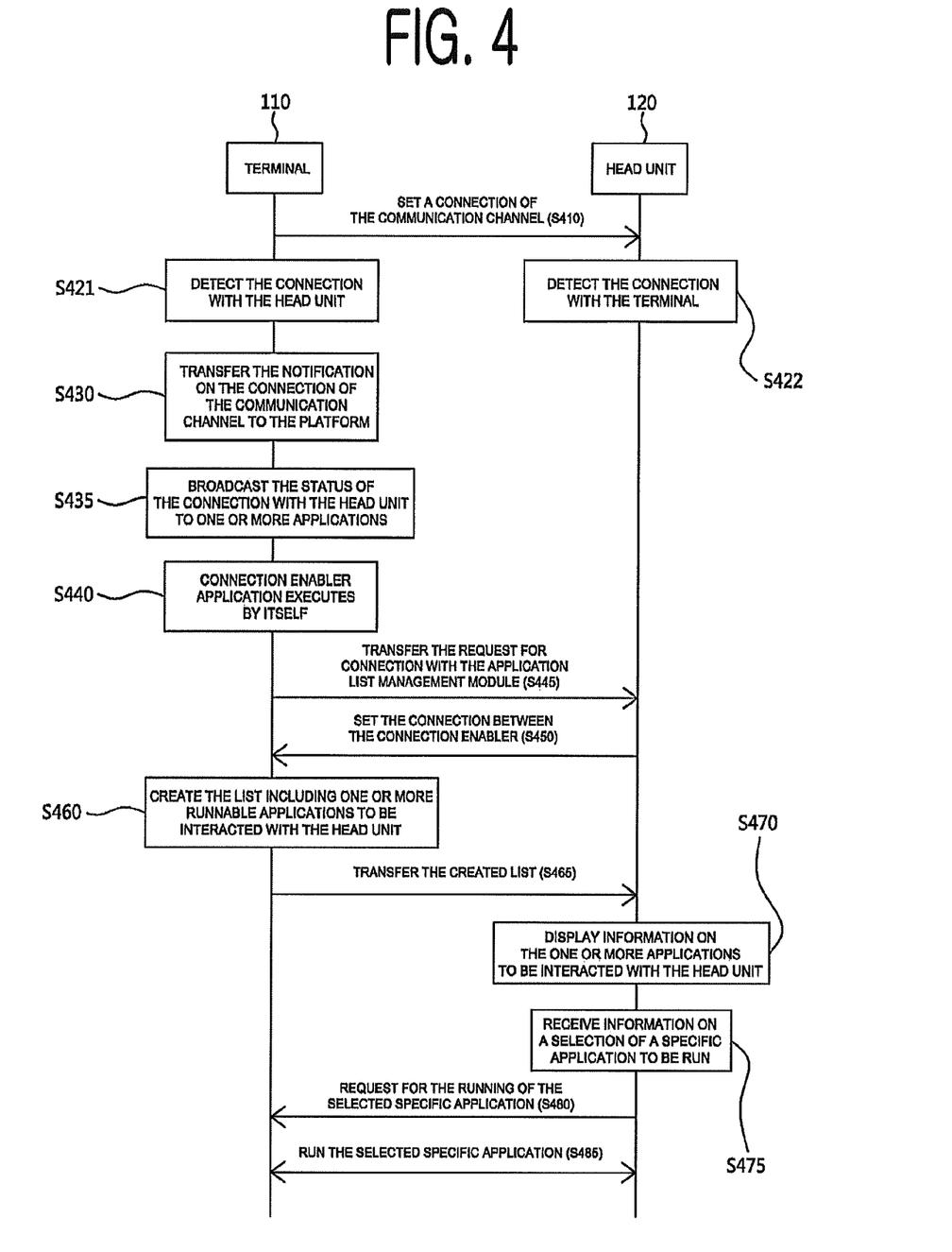
FIG. 4 is a flowchart of a method for providing the application services through interaction between the terminal and the head unit in accordance with an example embodiment of the present invention.

FIG. 4 is a flowchart of a method for providing application services through the interaction between the terminal 110 and the head unit 120 in accordance with one example embodiment of the present invention.

(i) First of all, the communication part 220 of the terminal 110 and the communication part 320 of the head unit 120 in accordance with an example embodiment of the present invention may set a connection of the communication channel between the terminal 110 and the head unit 120 at a step of S410.

(ii) Next, if the connection of the communication channel is set, the transport channel 111 of the terminal 110 in accordance with an example embodiment of the present invention may detect the connection with the head unit 120 at a step of S421. This means that the communication part 220 of the terminal 110 may detect the connection with the head unit 120.

Furthermore, as the connection is set by using the communication channel, the transport channel 121 of the head unit 120 in accordance with an example embodiment of the present invention may detect the connection with the terminal 110 at a step of S422. In other words, the communication part 320 of the head unit 120 may detect the connection with the terminal 110.

(iii) In other place, in accordance with an example embodiment of the present invention, if detecting the connection of the communication channel with the head unit 120, the transport channel 111 may transfer the notification on the connection of the communication channel to the platform 112 at a step of S430. In brief, if detecting the connection of the communication channel with the head unit 120, the processing part 210 may transfer the notification on the detected connection of the communication channel with the head unit 120 to the platform 112 of the terminal 110.

(iv) In sequence, in accordance with an example embodiment of the present invention, if receiving a notification on the connection of the communication channel, the platform 112 may broadcast the status of the connection with the head unit 120 to one or more applications in the terminal 110 at a step of S435, where the one or more applications may include the connection enabler application 115. More specifically, if the platform 112 receives the notification on the connection of the communication channel, the processing part 210 may allow the platform 112 to broadcast the status of the connection with the head unit 120 to the one or more applications installed in the terminal 110. It means that the processing part 210 may broadcast the status of the connection with the head unit 120 to the one or more applications in the terminal 110 or to one or more applications which has requested an alarm on the connection with the head unit 120, as the case may be.

(v) Next, in accordance with an example embodiment of the present invention, if receiving the broadcast of the connection status, the connection enabler application 115 can execute itself at a step of S440. More specifically, the processing part 210 may allow the connection enabler application 115 to execute itself when the connection enabler application 115 receives the broadcast on the status of the connection with the head unit 120. In other words, as the status of the connection is broadcasted to the connection enabler application 115, the processing part 210 may convert a non-execution status of the connection enabler application 115 such as sleep, suspended or stopped status or a pre-execution status thereof to an execution status.

(vi) In accordance with an example embodiment of the present invention, the connection enabler application 115 may transfer the request for connection with the application list management module 123, which manages applications of the head unit, to the connection software 122 of the head unit 120 through the communication channel with the head unit 120 at a step of S445. More specifically, the communication part 220 may allow the connection enabler application 115 to request for connection to the application list management module 123 of the head unit 120. It means that the communication part 220 of the terminal 110 may transfer the request for connection with the application list management module 123, which manages the applications of the head unit 120, to the communication part 320 of the head unit 120 through the communication channel with the head unit 120.

Additionally, the connection software 122 of the head unit 120 in accordance with an example embodiment of the present invention may receive the request for the connection with the application list management module 123 from the connection enabler application 115 through the communication channel with the terminal 110. In other words, the communication part 320 of the head unit 120 may receive the request for the connection with the application list management module 123 from the communication part 220 of the terminal 110 through the communication channel with the terminal 110.

(vii) Next, in accordance with an example embodiment of the present invention, by referring to the received request for the connection with the application list management module 123, the connection software 122 of the head unit 120 may set the connection between the connection enabler application 115 and the application list management module 123. Through the connection software 122, the connection enabler application 115 may set the connection with the application list management module 123 at a step of S450. More specifically, the communication part 320 of the head unit 120 may allow the connection enabler application 115 to be set to the connection with the application list management module 123 of the head unit 120 by interacting with the communication part 220 of the terminal 110. In other words, if receiving the request for the connection with the application list management module 123, the communication part 320 of the head unit 120 (and the communication part 220 of the terminal 110) may set the connection between the connection enabler application 115 and the application list management module 123 to transfer a list of one or more runnable applications to be interacted with the head unit 120 to be explained below.

(viii) In accordance with an example embodiment of the present invention, the connection enabler application 115 may automatically create the list including one or more runnable applications to be interacted with the head unit 120 which are selected among the one or more applications 114 installed in the terminal 110 at a step of S460. More specifically, the processing part 210 may allow the connection enabler application 115 that receives the broadcast of the status of connection with the head unit 120 to create the list of one or more runnable applications in the head unit 120. In other words, the processing part 210 may automatically create the list including one or more runnable applications to be interacted with the head unit 120 which are selected among the one or more runnable applications 114 installed in the terminal 110.

(ix) Next, in accordance with an example embodiment of the present invention, the connection enabler application 115 may transfer the created list of one or more applications to the application list management module 123 of the head unit 120 at a step of S465. In brief, the communication part 220 of the terminal 110 may transfer the created list of one or more applications to the communication part 320 of the head unit 120. The list may be transferred to the head unit 120 through the connection with the application list management module 123 explained at the step of S450.

The application list management module 123 of the head unit 120 may receive the list of one or more applications from the connection enabler application 115. That is to say, the communication part 320 of the head unit 120 may receive the list of one or more applications created by the connection enabler application 115 from the communication part 220 of the terminal 110.

As explained above, as the connection with the head unit 120 is detected, the step S460 of creating the list of one or more runnable applications to be interacted with the head unit 120 and the step S465 of transferring the list may be automatically taken without any interaction with the terminal user. In addition, the steps of S460 and S465 may be performed if the processing part 210 executes code of the connection enabler application 115 installed in the terminal 110 and the communication part 220 operates by the execution of the code of the connection enabler application 115.

(x) Next, in accordance with an example embodiment of the present invention, the application list management module 123 may display information on the one or more applications to be interacted with the head unit 120 by referring to the received list of the one or more applications at a step of S470, where the information on the one or more applications may include at least one of name, symbol, and icon of the one or more runnable applications to be interacted with the head unit 120. In other words, the display part 340 of the head unit 120 may display the information on one or more runnable applications to be interacted with the head unit 120 by referring to the aforementioned list.

(xi) Next, in accordance with an example embodiment of the present invention, the application list management module 123 may receive information on a selection of a specific application to be run among the one or more applications to be interacted with the head unit 120 from the user of the head unit 120 at a step of S475. In short, the input part 330 may receive the selection information on the specific application to be run thereamong from the user of the head unit 120.

(xii) Next, in accordance with an example embodiment of the present invention, the application list management module 123 may transfer a request for the running of the selected specific application to the connection enabler application 115 of the terminal 110 at a step of S480. In other words, the communication part 320 of the head unit 120 may transfer the request for the running of the selected specific application to the communication part 220 of the terminal 110. The connection enabler application 115 may receive a request for the running of the selected application from the application list management module 123. In other words, the communication part 220 of the terminal 110 may receive the request for the running of the selected application from the communication part 320 of the head unit 120.

(xiii) Next, the connection enabler application 115 and the application list management module 123 in accordance with an example embodiment of the present invention may run the selected specific application through the interaction therebetween at a step of S485. In other words, the processing part 210 of the terminal 110 may run the selected specific application through the interaction with the head unit 120. The processing part 310 of the head unit 120 may run the selected specific application through the interaction with the terminal 110.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

The present invention brings the effect of reducing the unnecessary operation and excessive interaction of the user in an environment where the terminal and the head unit are connected.

In accordance with the present invention, a variety of applications of the smart phone through the head unit by the connection enabler application automatically executed, if the terminal is connected with the head unit, may be provided and the safer and richer application services may be provided in a diversity of environments such as a driving environment to provide application which minimizes the user engagement.

What is claimed is:

1. A method for automatically providing an application service by an interaction with a vehicle head unit at a terminal, comprising steps of:
(a0) the terminal detecting a connection with the head unit;
(a1) the terminal transferring a notification of the connection of the communication channel to a platform thereof, when the connection of the communication channel is detected;
(a2) the terminal allowing the platform, upon receiving the notification, to broadcast the connection status with the head unit to one or more applications installed therein
(a) the terminal automatically creating a list including one or more runnable applications to be interacted with the vehicle head unit, said one or more runnable applications selected among one or more applications installed therein, when the connection with the head unit through a communication channel is detected; and
(b) the terminal transferring the list to the head unit;
wherein the steps of (a) and (b) are executed by a connection enabler application installed in the terminal and the connection enabler application is automatically executed when the connection with the head unit is detected,
wherein the broadcast of the connection status includes a broadcast to the connection enabler application, and wherein the terminal allows the connection enabler application that receives the broadcast of the connection status with the head unit to create a list of one or more runnable applications to be interacted with the head unit.

2. The method of claim 1, wherein the one or more applications are those which have requested an alarm on the connection with the head unit.

3. The method of claim 1, further comprising the steps of:
(a3) the terminal allowing the connection enabler application, if receiving the broadcast of the connection status with the head unit, to be executed by itself;
(a4) the terminal allowing the connection enabler application to request a connection to an application list management module of the head unit; and
(a5) the terminal allowing the connection enabler application to connect to the application list management module of the head unit.

4. The method of claim 1, further comprising the steps of:
(c) the terminal receiving a request for running of a specific application selected among the one or more applications included in the list from the head unit; and
(d) the terminal running the selected specific application through the interaction with the head unit.

5. A method for automatically providing a service of an application installed in a terminal by an interaction with the terminal; comprising the steps of:
(a) a vehicle head unit being connected to the terminal; and
(b) the head unit receiving from the terminal a list including one or more runnable applications to be interacted with the terminal, said one or more runnable applications selected among one or more applications installed in the terminal, when the terminal detects a connection of a communication channel with the head unit and automatically creates the list,
wherein at the step of (b), when the terminal transfers a notification of the detected connection of the communication channel to its platform and the platform is allowed to broadcast the connection status with the head unit to one or more applications installed in the terminal including a connection enabler application in case of the detection of the connection of the communication channel, and then if the connection enabler application automatically creates the list of one or more applications to be interacted with the head unit, the head unit receives the list of one or more runnable applications to be interacted therewith from the terminal.

6. The method of claim 5, wherein the step of (b) further includes the steps of:
(b1) the head unit receiving a request for a connection to an application list management module from the connection enabler application, if the connection enabler application receives the broadcast of the connection status therewith and then executes by itself; and (b2) the head unit supporting the connection enabler application to be connected with the application list management module, wherein the head unit receives the list of one or more runnable applications to be interacted therewith if the list is created by the connection enabler application.

7. The method of claim 5, further comprising the steps of:
(c) the head unit displaying information on the one or more runnable applications to be interacted therewith by referring to the list;
(d) the head unit receiving information on a specific application to be run selected by a user of the head unit among the runnable applications to be interacted therewith; and
(e) the head unit allowing the specific application to be run by interacting with the terminal.

8. A terminal for automatically providing an application service by an interaction with a vehicle head unit, comprising:
a processing part for automatically creating a list including one or more runnable applications to be interacted with the vehicle head unit selected among one or more applications installed therein, if the connection with the head unit through a communication channel is detected; and
a communication part for transferring the list to the head unit,
wherein the communication part detects the connection with the head unit, creation and transfer of the list are performed if the processing part executes code of a connection enabler application installed in the terminal and the communication part operates by the execution of the code of the connection enabler application, and the connection enabler application is automatically executed if the connection with the head unit is detected;
wherein the processing part transfers a notification of the connection of the communication channel to its platform if the connection of the communication channel is detected; and allows the platform, if receiving the notification, to broadcast the connection status with the head unit to one or more applications installed therein, including the connection enabler application, and allows the connection enabler application which receives the broadcast of the connection status with the head unit to create a list of one or more runnable applications to be interacted with the head unit.

9. The terminal of claim 8, wherein the one or more applications are those which have requested an alarm on the connection with the head unit.

10. The terminal of claim 8, wherein the processing part allows the connection enabler application to execute itself if the connection enabler application receives the broadcast of the connection status with the head unit; and
the communication part requests the connection enabler application thereof to connect to an application list management module of the head unit and allows the connection enabler application to connect to the application list management module of the head unit.

11. The terminal of claim 8, wherein the processing part receives a request for running of a specific application selected among the one or more applications included in the list from the head unit; and
wherein the communication part runs the selected specific application through the interaction with the head unit.

12. A vehicle head unit for automatically providing a service of an application installed in a terminal by an interaction with the terminal, comprising:
a communication part for detecting a connection with the terminal; and
a processing part for receiving a list including one or more runnable applications to be interacted with the terminal, said one or more runnable applications selected among one or more applications installed in the terminal from the terminal if a connection of the communication channel with the terminal is detected by the communication part and the list is automatically created by the terminal,
wherein, if the terminal transfers a notification on the detected connection of the communication channel to its platform and the platform broadcasts the connection status with the vehicle head unit to one or more applications installed in the terminal, including a connection enabler application in case of the detection of the connection of the communication channel, and the connection enabler application automatically creates the list of one or more runnable applications to be interacted with the head unit, the processing part receives the list.

13. The head unit of claim 12, wherein, if the connection enabler application of the terminal receives the broadcast of the connection status with the head unit and then the connection enabler application executes itself, the communication part receives a request for a connection to an application list management module of the head unit from the connection enabler application; supports the connection enabler application to be connected with the application list management module; and receives the list of one or more runnable applications to be interacted with the head unit if the list is created by the connection enabler application.

14. The head unit of claim 12, further comprising:
a displaying part for displaying information on the one or more runnable applications to be interacted therewith by referring to the list; and
an inputting part for receiving information on a specific application to be run selected by a user of the head unit among the runnable applications to be interacted therewith,
wherein the processing part runs the specific application by interacting with the terminal.

* * * * *